United States Patent [19]

Anttonen

[11] Patent Number: 5,340,375
[45] Date of Patent: Aug. 23, 1994

[54] METHOD AND APPARATUS FOR BENDING AND TEMPERING A GLASS SHEET

[75] Inventor: Kalevi K. Anttonen, Tampere, Finland

[73] Assignee: Tamglass Engineering Oy, Finland

[21] Appl. No.: 940,308

[22] Filed: Sep. 3, 1992

[30] Foreign Application Priority Data

Sep. 27, 1991 [FI] Finland ................................ 914551

[51] Int. Cl.$^5$ ...................... C03B 23/03; C03B 23/035
[52] U.S. Cl. .......................................... 65/104; 65/106; 65/182.2; 65/268; 65/273
[58] Field of Search .................. 65/104, 106, 182.2, 65/268, 273

[56] References Cited
U.S. PATENT DOCUMENTS
3,468,645 9/1969 McMaster et al. ................ 65/182.2

*Primary Examiner*—Joye L. Woodard
*Attorney, Agent, or Firm*—Burns, Doane, Swecker & Mathis

[57] ABSTRACT

The invention relates to a method and apparatus for bending and tempering a glass sheet. From a preheating furnace a glass sheet is advanced into a positioning and bending station supported by a gas bed between the stations. In the positioning and bending station the glass sheet is lifted by a ring mold from a gas bed and the glass sheet is heated for gravitational bending to close to a final profile. The glass sheet is pressed to its final profile or shape by an overhead press plate, which also serves as a vacuum pickup for carrying the bent glass sheet into a station for heating for tempering. After tempering, the glass sheet is advanced into a quenching station.

8 Claims, 6 Drawing Sheets

METHOD AND APPARATUS FOR BENDING AND TEMPERING A GLASS SHEET

BACKGROUND AND SUMMARY OF THE INVENTION

The present invention relates to a method for bending and tempering a glass sheet, in which method a glass sheet is heated in a furnace station close to a bending temperature, the heated glass sheet is carried into a positioning and bending station, wherein the glass sheet is supported by the pressure of an underneath gas bed and the glass sheet is positioned relative to a gas-bed surrounding ring mould by bringing the leading edge of a glass sheet gliding on the gas bed to collide with a positioning abutment and by lifting up a positioning abutment for the trailing edge and/or side edges the glass sheet is partially or completely laid to be supported by the ring mould, the glass sheet is heated and allowed to bend gravitationally close to a final bending shape.

The invention relates also to an apparatus for bending and tempering a glass sheet, comprising a preheating furnace, a positioning and bending station and a quenching station, the positioning and bending station including a glass-sheet supporting gas bed, a gas-bed surrounding ring mould which is reciprocable in vertical direction, and positioning elements for positioning the gas-bed supported glass sheet relative to the ring mould.

This type of method and apparatus are known e.g. from U.S. Pat. Nos. 3,468,645; 3,607,200; 3,846,104; 3,869,271; 4,229,200 and 4,432,782, which are briefly referred to in U.S. Pat. No. 4,612,031.

An object of the present invention is to further develop this type of method and apparatus in view of further improving the achievement of the following objectives:
1. Strict profile tolerances (particularly at glass sheet edges)
2. Acceptable optics despite sufficient heating for proper tempering
3. Sufficient capacity
4. Flexible, a glass-type replacement time about half a working day.

Thus, the invention seeks to provide a solution, whereby a glass sheet made a homothermal as possible is capable of bending all the way to the edges and corners and then capable of retaining the glass shape or profile during the course of heating and transfer to tempering in an accurately bent form.

These objects of the invention are achieved on the basis of inventive characterizing features set forth in the annexed claims.

BRIEF DESCRIPTION OF THE DRAWING FIGURES

The application of a method of the invention as well as the design and operation of an apparatus of the invention will now be described in more detail with reference made to the exemplatory embodiment illustrated in the accompanying drawings. In the drawings FIG. 1 shows an apparatus of the invention in vertical section (corresponding to section I—I in FIG. 2);

Figure 6:
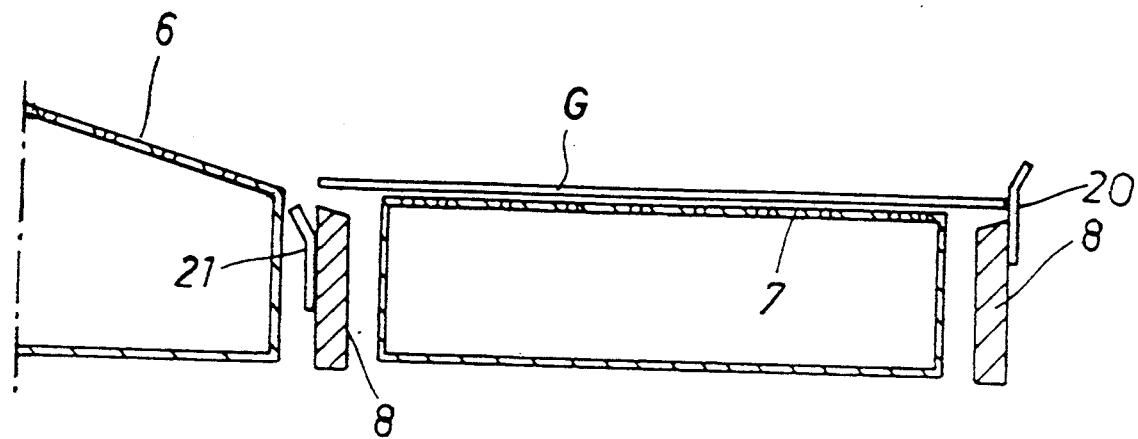

FIGS. 5(a)-(d) show the positioning of a glass sheet in a bending and positioning station (operations a and b) as well as the bending stages of a glass sheet (operations c and d) in the same station; and FIG. 6 shows an alternative embodiment of the positioning and bending station of FIG. 5.

DETAILED DESCRIPTION OF THE DRAWING FIGURES

Design of the apparatus will be studied first,

The preheating of a glass sheet is effected in a furnace station 1, which can be of any known type of heating furnace. In the present case, the heating furnace is fitted with horizontal conveyor rollers 1a for manipulating a glass sheet to be heated thereupon. Thus, the furnace 1 is used to produce a flat glass uniformly heated close to a bending temperature. Furnace 1 is followed by a positioning and bending station 2 provided with a gas bed 7 for supporting a glass sheet, a gas-bed surrounding ring mould 8, which is reciprocable in vertical direction, and positioning elements 20, 21 for positioning a glass sheet G carried by gas bed 7 relative to ring mould 8. A second gas bed 6 is located between preheating furnace 1 and ring mould 8.

The positioning and bending station 2 is followed by a heating station 3 containing a vacuum-fitted press mould or plate 10, the shape of whose surface matches a desired bending profile. Below the press plate 10, said station 3 is provided with heating resistances 17. Stations 2 and 3 are thermally insulated and so is furnace 1. Along the side walls of the stations extend roller tracks, which are built by rollers 11 and along which said press plate 10 can be manipulated upon rails 12. The manipulation can be effected, e.g., by means of a horizontal manipulator rod 13 reciprocated by a motor 15 in a manner that the press plate 10 can be manipulated between stations 2 and 3. The roller tracks formed by rollers 11 may also extend into a quenching station 4, whereby a glass sheet supported by the vacuum of press plate 10 can be carried by said press plate 10 into quenching station 4, wherein the glass sheet is laid upon a quenching rim 19. In an alternative embodiment, the quenching rim 19 can be adapted to travel between stations 3 and 4. The quenching station 4 is provided with upper and lower jet nozzles 18 for blasting cold tempering air to both surfaces of a glass sheet. In an after-cooling station 5 occurs the cooling of a tempered glass sheet to a handling temperature.

Operation of the apparatus proceeds as follows. A flat and uniformly heated glass sheet is driven from the furnace by means of roller conveyor 1a onto pressure table 7. The transfer is facilitated by a pressure table 6. As illustrated in FIG. 6, the pressure table 6 can be slightly inclined in a downward direction towards pressure table 7. Positioning is effected in a manner that the leading edge of a glass sheet G gliding at a slow rate of speed collides with a fixed positioning abutment 20 (FIG. 5), which is secured to ring mould 8. A positioning abutment 21 for the trailing edge and/or side edges is lifted up and, thus, glass sheet G is properly positioned relative to ring mould 8. Vacuum and/or press plate 10 is located in heating station 3. In the quenching station 4, upper nozzles 18 are up and quenching rim 19 is in a lower position. The glass sheet G positioned on ring mould 8 is picked up from gas bed 7 by lifting ring mould 8 upwards, said glass sheet G remaining supported by ring mould 8 (FIG. 5, operation c). The glass sheet G heated by resistances 16 begins to bend or sag; pre-bending of glass occurs. The press plate 10 advances from heating station 3 into positioning and bending station 2. Ring mould 8 lifts the pre-bent glass into contact with press plate 10 for effecting a final bending. A vacuum manifold 14 is used to switch on suction in the intake holes 10a of press plate 10 and ring mould 8 is lowered to its bottom position, the bent glass BG remaining supported by press plate 10. The movable abutment stop 21 of ring mould is lowered down.

The following piece of glass may come out of the pre-heating furnace into positioning and bending station 2 and the above action is repeated thereon. The bent glass advances in horizontal direction supported by press plate 10 into heating station 3 for effecting the temperature compensation of a bent glass sheet and tempering by means of resistances 17. Naturally, it is also possible to employ hot-air blasting from below. The tempered glass advances supported by press plate 10 in horizontal direction into quenching station 4. Quenching rim 19 is lifted into contact with the glass and press plate 10 is devacuumed. Quenching rim 19 goes down and press plate 10 returns into tempering station 3 and is ready to work on a following piece of glass pre-bent in station 2. As pointed out above, instead of press plate 10, said quenching rim 19 can be adapted to travel between stations 3 and 4 if it is possible to make sure that the deformations of glass heated to a tempering temperature remain at minimum and stay within acceptable tolerances during the transfer effected by quenching rim 19. In quenching station 4, the upper nozzles 18 lower down and glass tempering occurs. Thereafter, the upper nozzles 18 rise up and the bent tempered glass is lifted to after-cooling and quenching station 4 is ready to receive the subsequent piece of glass.

Figure 1:
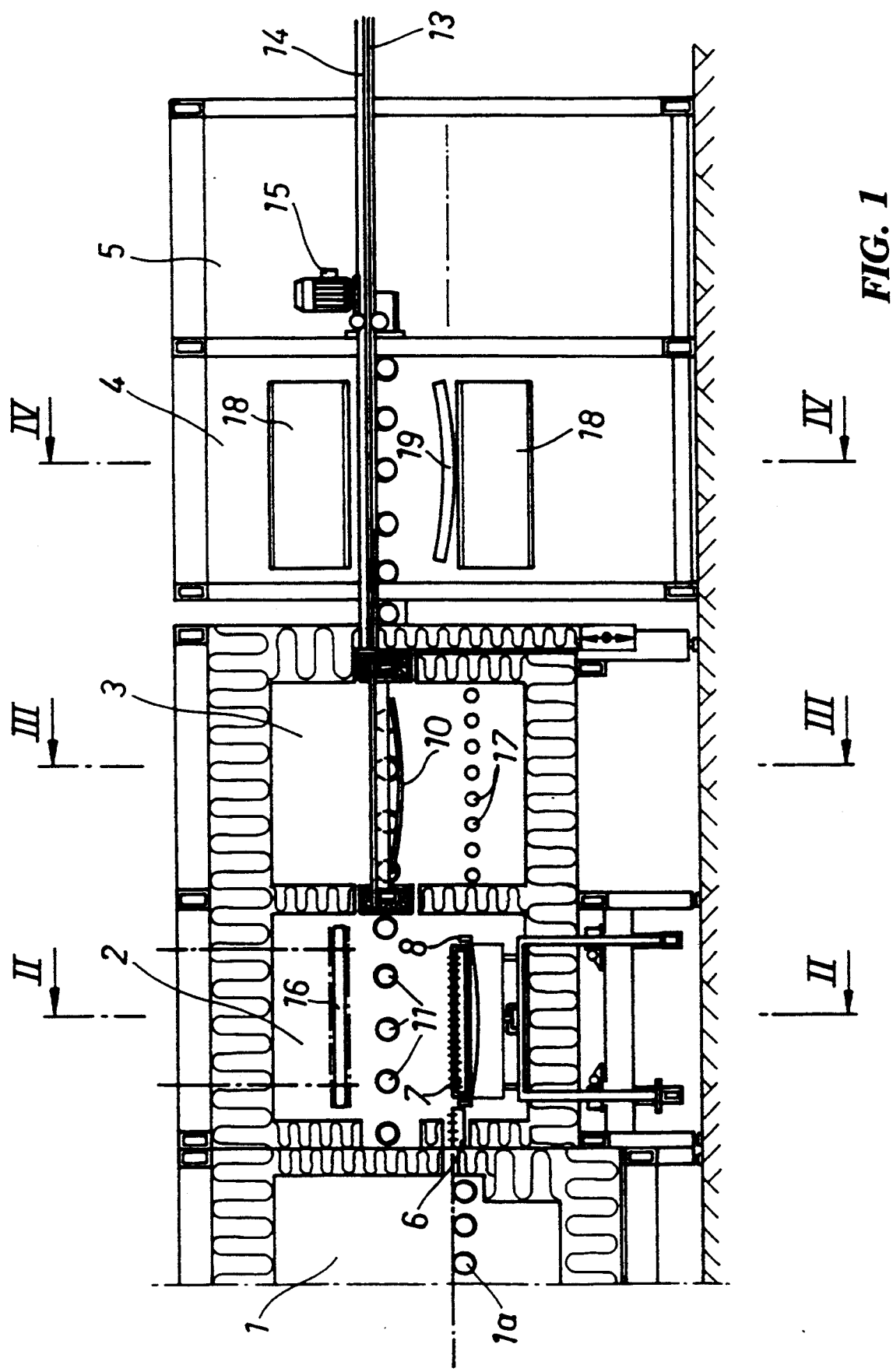
Figure 2:
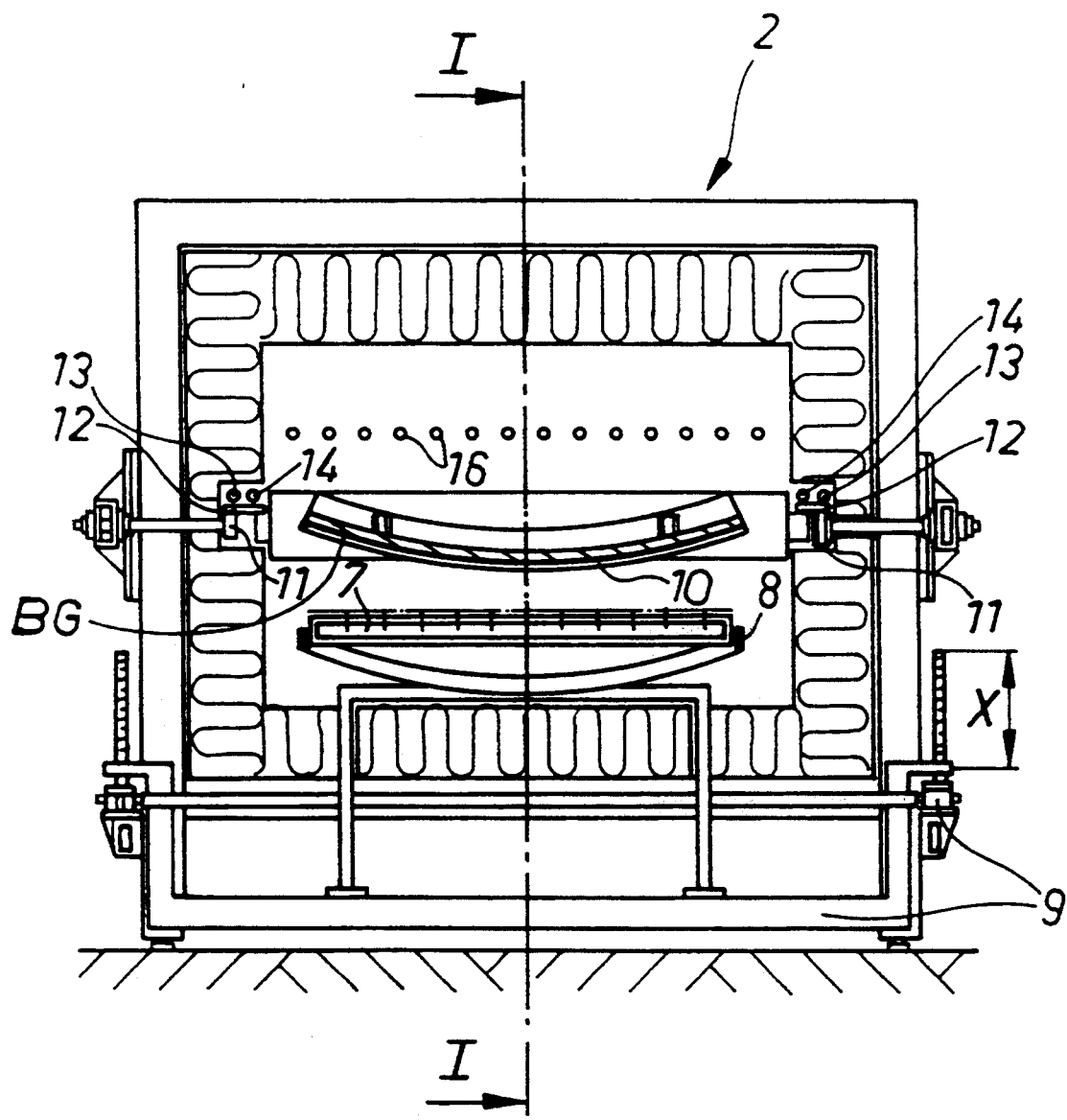
FIG. 2 shows 3 bending station of the apparatus in cross-section along a line II—II in FIG. 1.
Figure 3:
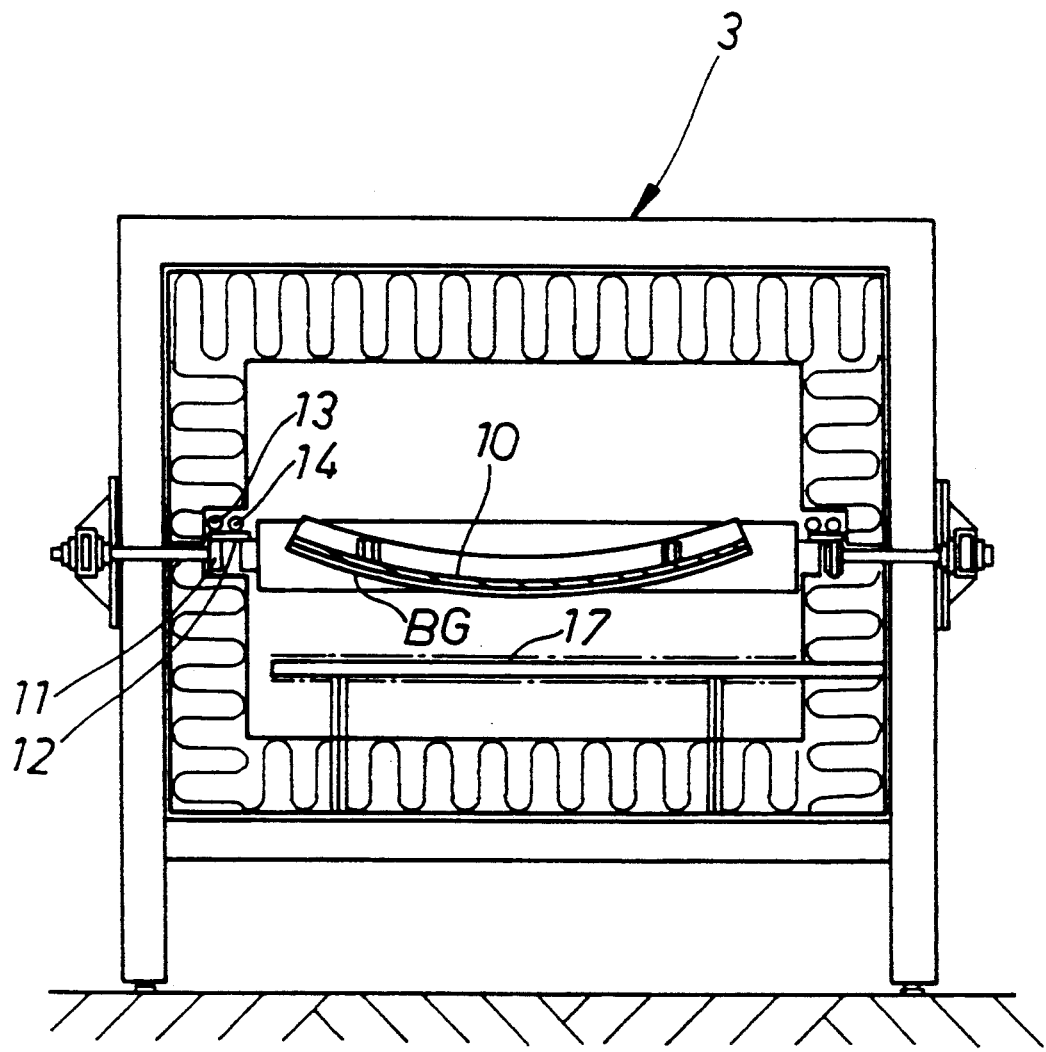
FIG. 3 shows a tempering station of the apparatus in cross-section, corresponding to section III—III in FIG. 1.
Figure 4:
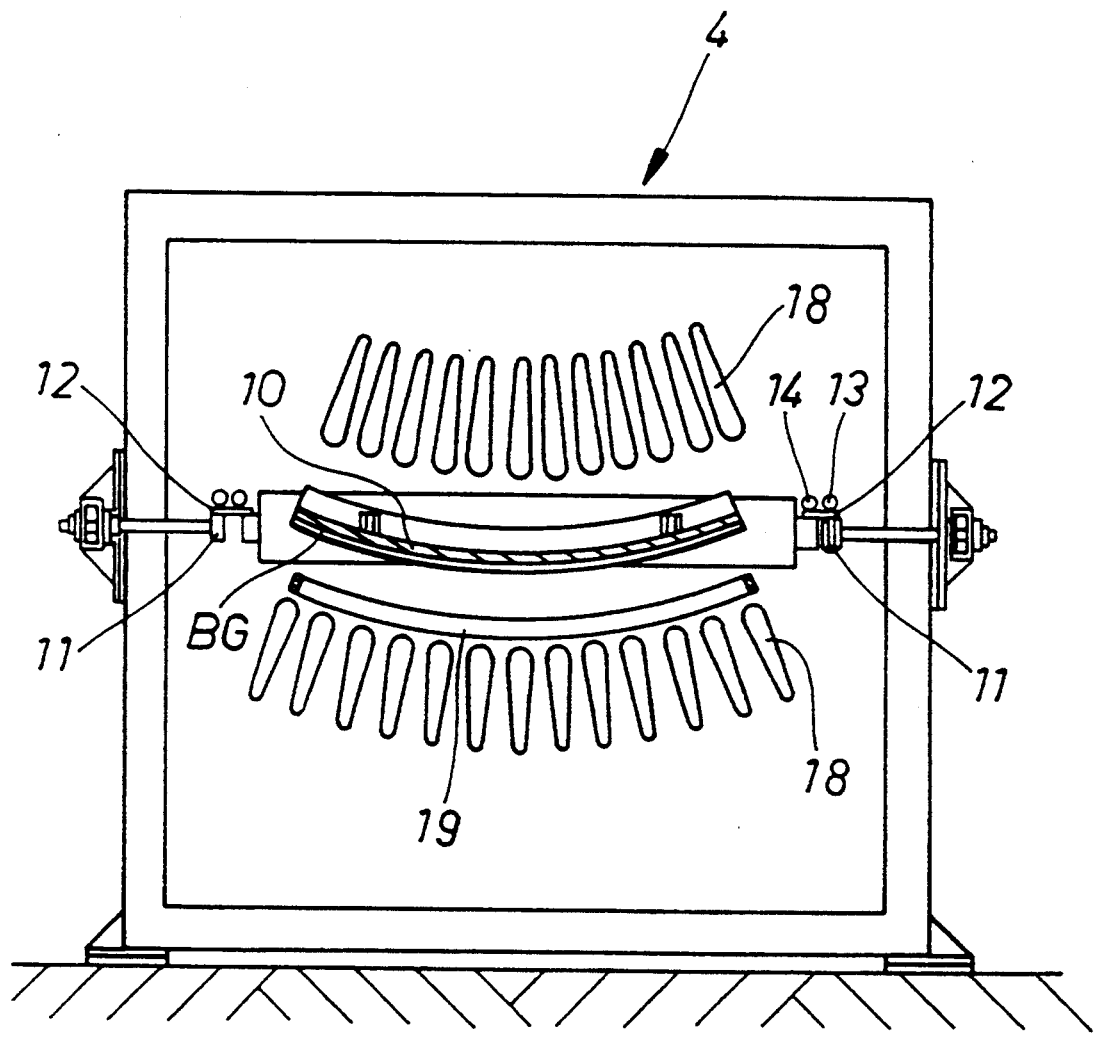
FIG. 4 shows a quenching station of the apparatus in cross-section, corresponding to section IV—IV in FIG. 1.
Figure 5A:
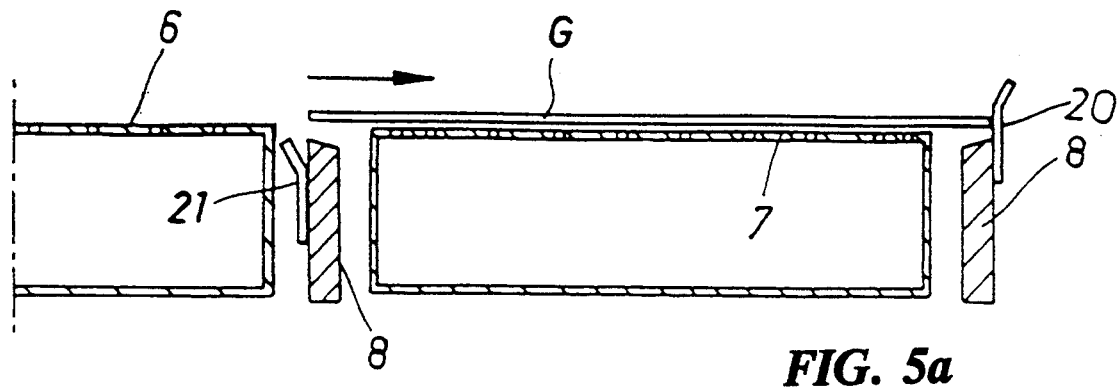
Figure 5B:
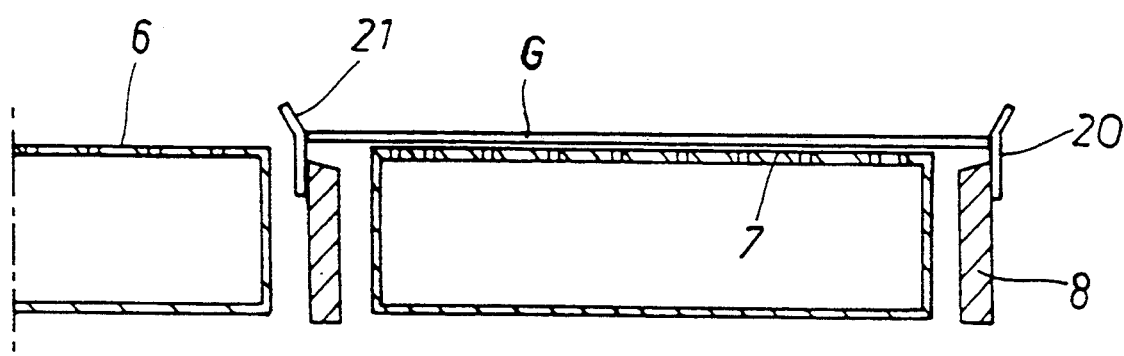
Figure 5C:
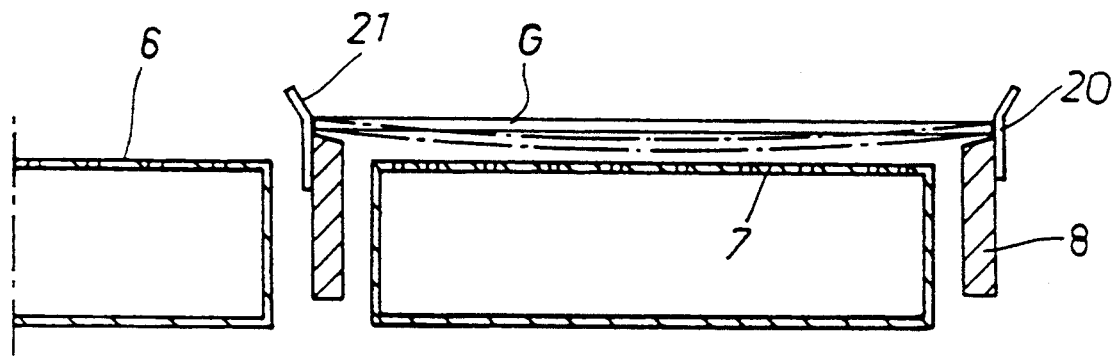
Figure 5D:
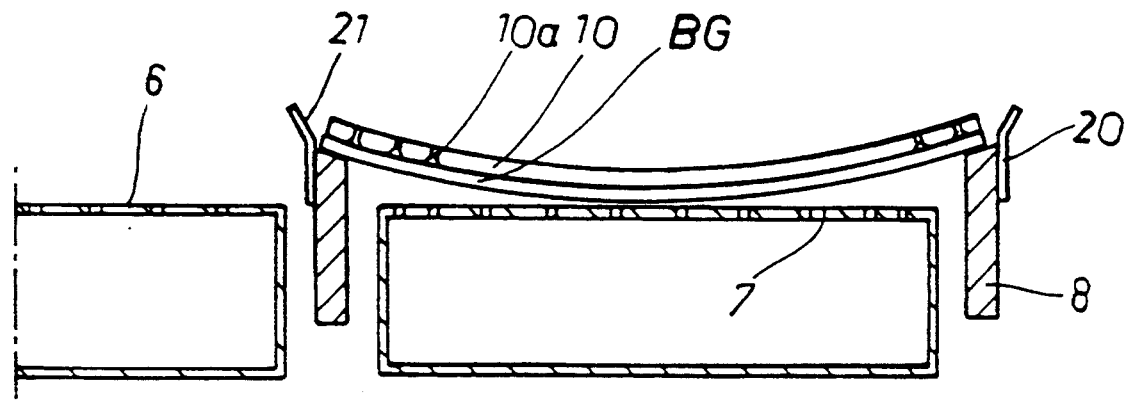

In FIG. 2, reference numeral 9 indicates ring mould pick-up means 9 for lifting and lowering ring mould 8 a distance X, which is sufficient in order that press plate 10 only need to be manipulated in horizontal direction. The vacuum-fitted press plate 10 is whole-surfaced. It can be made of a rather thick, heat-resistant sheet or it can be of box-type construction for supplying vacuum to intake holes 10a. Press plate 10 is stored in heating station 3, wherefrom it advances by means of its carrier wagon running on rollers 11 into bending station 2 and possibly also into chiller 4. In heating station 3, a glass sheet supported by press plate 10 can, if necessary, be heated indirectly also through press plate 10.

A primary benefit offered by the invention is that the end products will be precisely dimensioned in shape. The glass edges will be pressed between two exactly properly shaped surfaces and sagging of the mid-portion is prevented by the vacuum of press mould 10 during the course of tempering and, if necessary, also during the transfer to quenching. The apparatus is also capable of achieving high production capacity. Especially the use of a separate tempering station facilitates the periodic order of various operations, so that no individual operation unreasonably limits capacity. An apparatus of the invention is also relatively easy to modify to suit various types of glass. For the replacement of a type of glass, a ring-mould 8 installation carriage is pulled out of the side of a furnace for replacing said ring mould 8 (along with its pressure bed). A new ring mould, together with its pressure bed, can already be preheated to a certain temperature prior to inserting it in the installation carriage in its position; total replacement time is reduced. Press plate 10 can be driven into a quenching station, cooled and replaced while its carrier wagon is in quenching station 4, wherein a quenching rim 19 must also be replaced to match a new glass profile.

What is claimed is:

1. A method for bending and tempering a glass sheet, comprising: heating a glass sheet in a furnace station close to a bending temperature; transferring the heated glass sheet into a positioning and bending station;

supporting the glass sheet during a transfer period between the furnace station and the positioning and bending station upon a gas bed located between the furnace and the positioning and bending station;

supporting the glass sheet at least initially in the positioning and bending station by the pressure of an underneath gas bed;

positioning the glass sheet in the positioning and bending station relative to a ring mould surrounding the underneath gas bed by bringing a leading edge of the glass sheet gliding on the underneath gas bed to collide with a positioning abutment cooperating with the ring mould and lifting up an additional positioning abutment cooperating with the ring mould for at least one of a trailing edge and side edges of the glass sheet, and raising the ring mould and supporting the glass sheet at least partially by the ring mould;

heating the supported glass sheet and allowing the supported glass sheet to bend gravitationally close to a final bending shape;

carrying a vacuum-fitted press plate, the shape of whose surface matches a desired bending profile, from a heating station to the positioning and bending station to a position above the gravitationally bent glass sheet;

causing relative vertical movement between the press plate and the ring mould to approach each other for effecting final bending of the glass sheet as a press bending operation between the press plate and the ring mould;

switching on the vacuum of the press plate and by relative vertical movement drawing the ring mould away from the glass sheet, whereby the glass sheet is supported by the press plate;

carrying said press plate, along with the supported glass sheet into the heating station;

effecting the heating for tempering of the bent glass sheet vacuum-supported by the press plate; and carrying the heat, bent glass sheet to a quenching station.

2. A method as set forth in claim 1, wherein said press plate is manipulated only in horizontal direction back and forth and said ring mould is manipulated back and forth only in vertical direction.

3. A method as set forth in claim 1, wherein the heated, bent glass sheet is carried from the heating station into the quenching station by said press plate and is released onto a quenching rim located in the quenching station.

4. A method as set forth in claim 1, wherein the heated, bent glass sheet is carried from the heating station into the quenching station by a quenching rim, whereupon the heated, bent glass sheet is released from the press plate onto the quenching rim in the heating station.

5. An apparatus for bending and tempering a glass sheet, comprising:

a preheating furnace;

a positioning and bending station including a glass sheet supporting gas bed;

a quenching station;

a ring mould in the positioning and bending station and surrounding the gas bed, said ring mould being reciprocable in vertical direction;

means for positioning a glass sheet supported by the gas bed relative to the ring mould;

a second gas bed located between the preheating furnace and the positioning and bending station for supporting a preheated glass sheet during transfer to the positioning and bending station;

a heating station between the positioning and bending station and the quenching station;

a press plate, which is fitted with vacuum means and the shape of whose surface matches a desired bending profile;

transfer means for manipulating said press plate in a horizontal direction back and forth between the heating station and the positioning and bending station; and heating means in the heating station for heating a bent glass sheet supported by the press plate to a tempering temperature.

6. An apparatus as set forth in claim 5, wherein said transfer means manipulate the press plate also between the heating station and the quenching station for carrying a heated glass sheet into said quenching station.

7. An apparatus as set forth in claim 5, further comprising a quenching rim movable between the heating station and the quenching station for carrying a heated glass sheet into said quenching station.

8. An apparatus as set forth in claim 5, wherein said second gas bed is slightly inclined in a downward direction towards the supporting gas bed.

* * * * *